(12) United States Patent
Krumm Cabezas

(10) Patent No.: US 12,544,102 B2
(45) Date of Patent: Feb. 10, 2026

(54) SKIN MARKING DEVICE

(71) Applicant: Santiago Krumm Cabezas, Needham, MA (US)

(72) Inventor: Santiago Krumm Cabezas, Needham, MA (US)

( * ) Notice: Subject to any disclaimer, the term of this patent is extended or adjusted under 35 U.S.C. 154(b) by 0 days.

(21) Appl. No.: 18/412,763

(22) Filed: Jan. 15, 2024

(65) Prior Publication Data

US 2025/0228590 A1 Jul. 17, 2025

(51) Int. Cl.
*A61B 17/00* (2006.01)
*A61B 17/34* (2006.01)

(52) U.S. Cl.
CPC ..... *A61B 17/3403* (2013.01); *A61B 2017/00982* (2013.01); *A61B 2017/3413* (2013.01)

(58) Field of Classification Search
CPC ...... A61B 17/3403; A61B 2017/00982; A61B 2017/3413
See application file for complete search history.

(56) References Cited

U.S. PATENT DOCUMENTS

| | | | |
|---|---|---|---|
| 7,909,815 B2 | 3/2011 | Whitmore, III | |
| 8,123,689 B1 * | 2/2012 | El-Sabawi | A61B 90/39 600/437 |
| 9,486,162 B2 | 11/2016 | Zhuang | |
| 10,537,302 B2 | 1/2020 | Hagy | |
| 10,660,667 B2 | 5/2020 | Rohling | |
| 11,241,214 B2 | 2/2022 | Willis | |
| 11,382,655 B2 | 7/2022 | Bouazza-Marouf | |
| 2005/0033315 A1 | 2/2005 | Hankins | |
| 2005/0203490 A1 | 9/2005 | Simonson | |
| 2017/0007200 A1 | 1/2017 | Hagy | |
| 2021/0259726 A1 | 8/2021 | Wang | |
| 2023/0000519 A1 | 1/2023 | Zeng | |
| 2023/0087163 A1 | 3/2023 | Christen | |

FOREIGN PATENT DOCUMENTS

| | | |
|---|---|---|
| CN | 217611290 U * | 10/2022 |
| CN | 110430809 B | 9/2023 |
| WO | 2022110014 A1 | 6/2022 |

* cited by examiner

*Primary Examiner* — Keith M Raymond
*Assistant Examiner* — Adam D. Kolkin
(74) *Attorney, Agent, or Firm* — Lambert Shortell & Connaughton; David J. Connaughton, Jr.; Justin P. Tinger

(57) ABSTRACT

A skin marking device is provided. The skin marking device has an outer frame that can be fitted over an ultrasound probe. The ultrasound probe can be used to identify a location for a needle or other medical device. Once the location is identified, the probe may be removed while keeping the frame in place. A skin-marking tool may then be fitted with/into the frame to mark the skin, thereby identifying the precise location for action.

10 Claims, 5 Drawing Sheets

SKIN MARKING DEVICE

BACKGROUND OF THE INVENTION

The present disclosure relates generally to skin marking devices. More particularly, the present disclosure relates to a device which may use a frame to identify a location for needle placement based on ultrasound, and a marking device which fits within the frame to mark the skin for subsequent needle placement.

Placement of spinal, epidural, or other needles, in the epidural or intrathecal space can sometimes be challenging due to bony structures obstructing the path of the needle; finding the correct insertion site that will allow a direct, unobstructed path for the needle can sometimes be difficult.

In the prior art, technicians sometimes use their fingers to feel the spacing between bones. This can be difficult and unreliable in many cases due to surrounding muscle, fat, and inherent imprecision of doing things by "feel." Other practices include using an ultrasound probe, however, in many instances, the ultrasound probe must be removed from the skin after identifying an adequate space for placement, and then needle placement occurs after removal of the ultrasound probe. US imaging of the spine allows for identification of gaps within the bony spine, but the technician must then mark the area with a marker, pen, or the like, and then remove the probe. The optimal area is inherently at the center point of the ultrasound probe which cannot be directly accessed without removing the probe. Ultrasound jelly makes marking difficult, because one cannot mark well through it, and marks can be erased when gel is wiped off the skin; more importantly, the ultrasound probe must be removed from the skin, to access the point on the skin that corresponds to the center point of the probe when the appropriate image for a space for needle insertion is seen on screen, and the technician can only estimate the spot where the center of the probe was before it was removed.

Therefore, what is needed is a system which can mark a location for needle insertion reliably after the location is identified by an ultrasound or other imaging device.

SUMMARY OF THE INVENTION

The subject matter of this application may involve, in some cases, interrelated products, alternative solutions to a particular problem, and/or a plurality of different uses of a single system or article.

In one aspect, a skin-marking assembly is provided. The skin marking assembly has an outer frame sized to fit closely around an outer perimeter of an ultrasound probe. The assembly further having a marking tool which has top, bottom, left and right edges. These top, bottom, left edge, and right edge are each sized to slideably fit within an inner perimeter of the outer frame. Though in other similar aspects the marking tool may fit to any part of the frame without straying from the scope of this disclosure. The marking tool may further have a protrusion on a front side. The protrusion is sized and configured to form an indent in the skin of a patient when pushed into the skin, so as to mark the skin.

In another aspect, the skin marking assembly has an outer frame sized to fit closely around an outer perimeter of an ultrasound probe. The assembly, further having a marking tool which has top, bottom, left and right edges. These top, bottom, left edge, and right edge are each sized to slideably fit within an inner perimeter of the outer frame. Though in other similar aspects the marking tool may fit to any part of the frame without straying from the scope of this disclosure. The marking tool may further have a protrusion on a front side. This protrusion defines an open shape such that a central opening is defined at a front of the protrusion.

In yet another aspect, a method of marking an area of a patient for placement of an epidural or the like is provided. The method begins with placing or otherwise connecting a frame of a skin-marking assembly on an ultrasound probe. The ultrasound probe may then be used with an ultrasound device to identify a desired location for needle placement, such as a spacing between vertebrae of a patient. Once identified, the frame can be held in place in the position identified and the ultrasound probe can be removed from the frame and away from the patient. A marking tool may then be placed into the frame or connected to the frame. Then, this marking tool can be used for marking the skin of the patient at a location corresponding to the center point of the ultrasound probe.

DETAILED DESCRIPTION OF THE INVENTION

Figure 1:
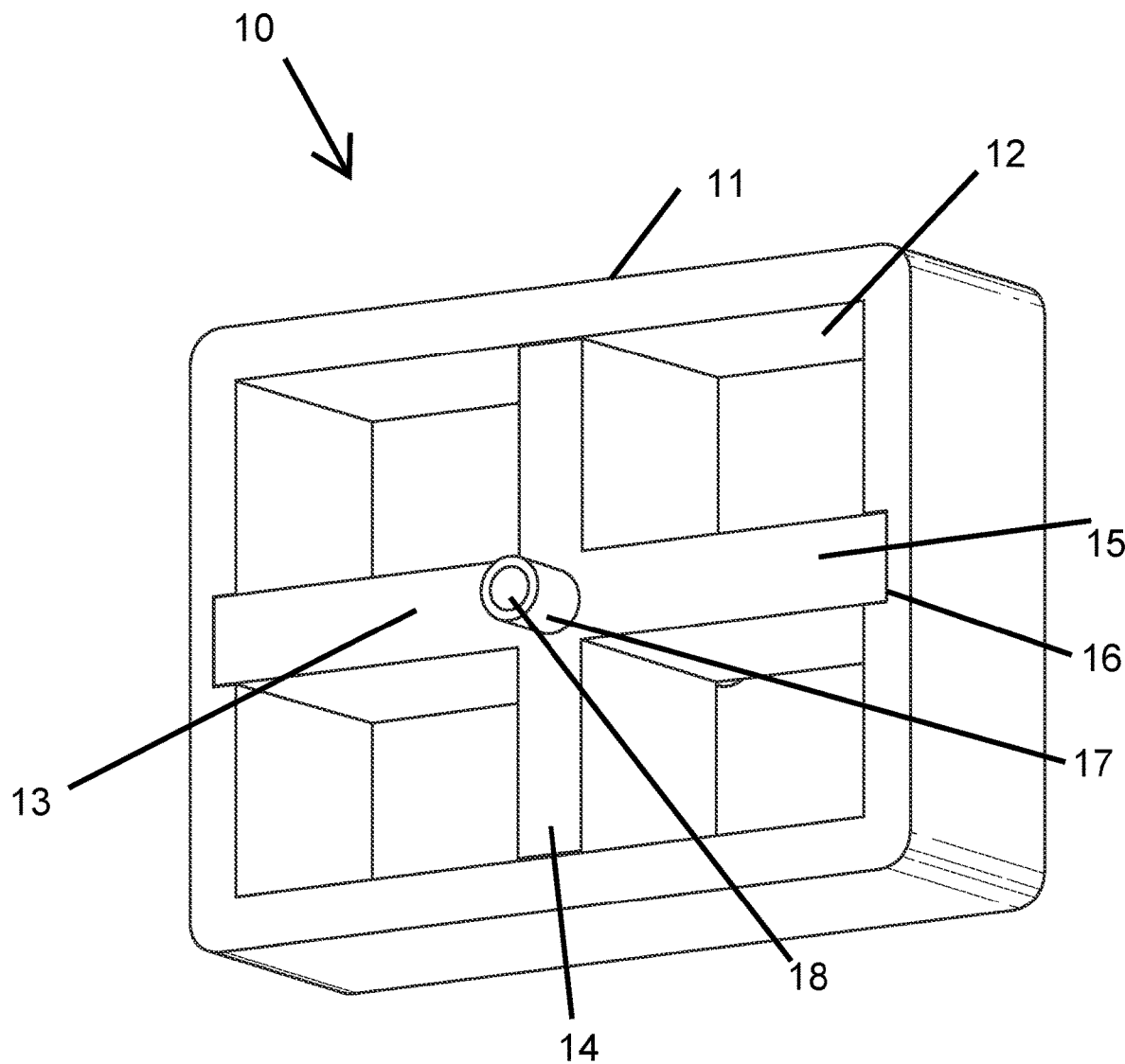
FIG. 1 provides a perspective view of an embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a skin marking device, also referred to as a skin marking assembly. The present disclosure relates to a device which allows precise marking on a patient as to where to place a needle, cannula, other medical tools, and the like. This system greatly limits the chance of improper needle (and other) placement, creating better and safer patient outcomes.

The system involves, in most embodiments, two parts-a frame which fits around, or partially around, or otherwise engages with a probe of an ultrasound, and a marking tool which engages with the frame and can be used to mark, or guide a marker on the skin of the patient. The mark made using the marking tool can then be used to guide placement of a needle and the like. These components may vary in size, shape, and configuration depending on manufacturer and type of ultrasound probe used.

In many embodiments, the frame is formed of a rectangular, oval, or other similar open shape which has an inside perimeter which fits around the outside perimeter of the ultrasound probe. Other embodiments may use a non-closed shape, like an open frame which connects to only one, two, or three sides of the probe.

In many embodiments, the skin marking tool is sized to precisely engage with the frame. For example, the marking tool may have an outer perimeter, or extending arms, which fit to the frame in only one orientation such that the skin marking can only be made in one place based on frame position. This eliminates the risk of human error in the marking process. For example, the marking tool may have a shape that only allows for it to fit to the frame in one orientation. Preferably, the tool will have at least two points of contact with the frame to ensure that correct orientation of the marking is achieved.

In one embodiment of operation, a method of using the device disclosed herein for marking an area of a patient for placement of an epidural needle (among other operational uses) may first involve placing a frame of a skin-marking assembly over an ultrasound probe. The probe and frame are then placed on the skin of the patient and the probe is manipulated to identify a desirable location for the placement of the epidural, with the frame moving with the ultrasound probe. The location may be identified as, e.g. a spacing between spinous processes of the vertebrae of the patient. The technician may then hold the frame in place while the probe is removed. Next, while holding the frame in place, the marking tool can then be placed into the frame to mark the patient's skin in the desired area as identified by the ultrasound probe. Typically the marking tool is configured to mark the skin at a location where the center of the ultrasound probe was. The marking tool may then be used to mark the skin and/or as a needle guide. Marking may be by pushing a protrusion on the tool into the skin, using a marker or other marking device (which may be either mounted to the marking tool or used in conjunction with the marking tool). In marking embodiments, the entire assembly may be removed because the mark has been made on the patient for subsequent epidural placement. In other embodiments wherein the marking tool is used as a needle guide, the assembly may remain in place, or the frame may be removed.

Turning now to FIG. 1 a perspective view of an embodiment of the skin marking assembly is provided. The skin marking assembly 10 has an outer frame 11 which fits around an ultrasound probe, and a marking tool 13 which fits within the frame 11. As shown below, the frame 11 fits around the ultrasound probe for proper positioning. The probe can be removed and the skin marking tool 13 fits within the inner perimeter 12 of the frame 11. The marking tool 13, in this embodiment, has a cross shape. Of course, any other shape may be used without straying from the scope of this invention. The marking tool 13 has vertical arms 14 and horizontal arms 15. The horizontal arms 15, in this embodiment, fit into slots 16 defined by the inner perimeter 12 of the frame 11. Of course, other configurations such as slots to engage with the top and bottom vertical arms 14 in addition or instead may also be used. In this view, the vertical arms 14 frictionally fit with the inner perimeter 12 wall of the frame 11 or have a small gap therebetween. The slots 16 ensure proper positioning and provide a secure path for marking. The marking tool 13 further has a protrusion 17 which extends from front and rear (not shown) of the marking tool 13. The protrusion 17 can be used to press into the skin, making an indent or mark. In the embodiment shown, the protrusion 17 defines a central opening 18 which has been found to provide a better marking by providing increased pressure on the non-open space of the protrusion 17. In further embodiments, this central opening 18 may extend from front to back all the way through the marking tool 13. In such an embodiment, a needle may be passed through the central opening 18 using the marking tool 13 as a needle guide.

Figure 2:
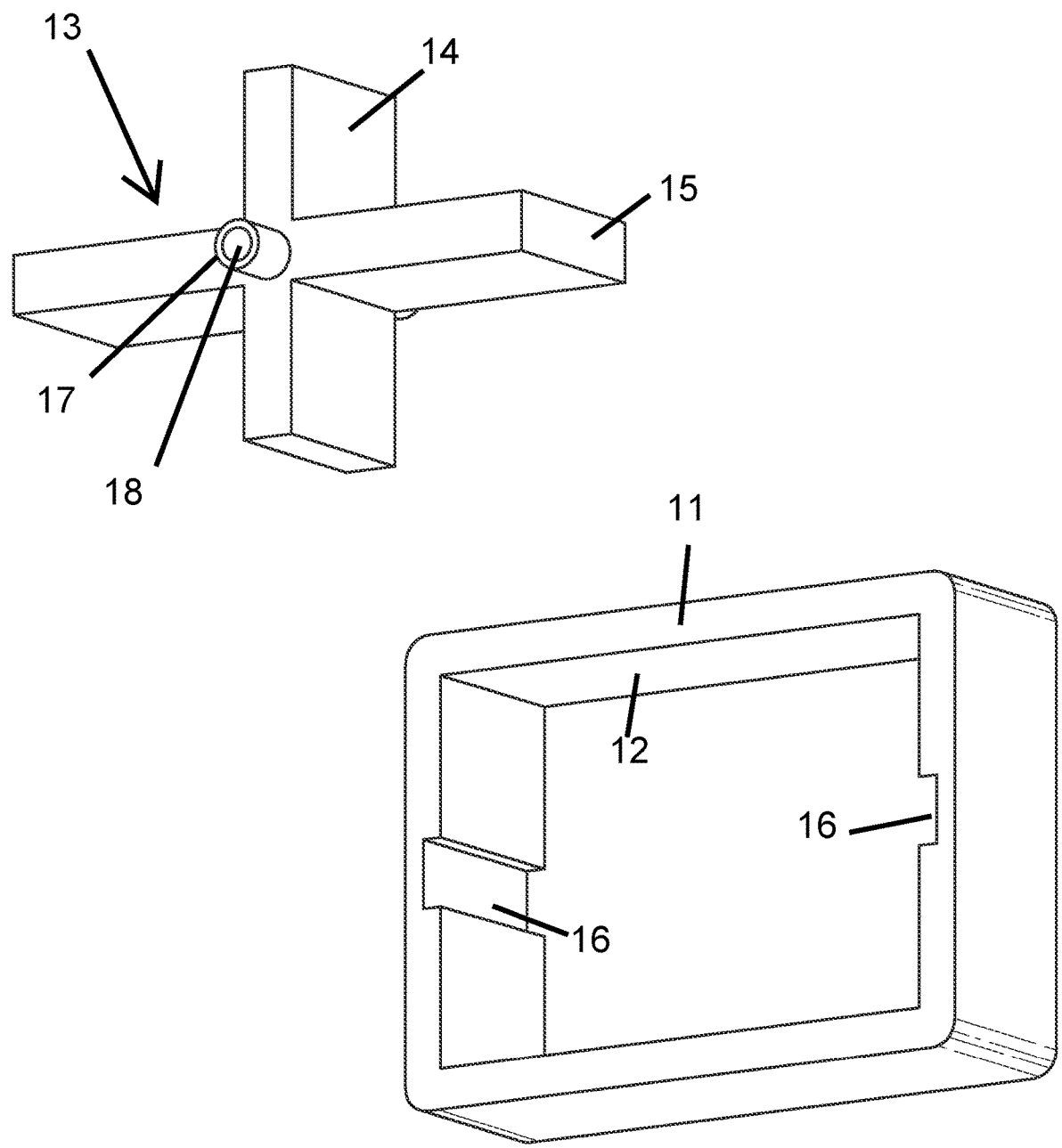
FIG. 2 provides a perspective view of another embodiment of the present disclosure.

FIG. 2 shows another embodiment of the present disclosure having the frame and marking tool separated. The frame 11 has an inner perimeter 12 which defines slots 16 on opposite vertical walls, facing each other and vertically aligned with each other. As noted, the slots may take other orientations such as being off set, being formed as channels to hold the tool in place (such as a T-shaped channel), may be on the horizontal walls, and the like, without straying from the scope of this invention. The marking tool 13 is shown in this embodiment as a cross-shaped device with vertical arms 14 which are sized to fit very closely to the top and bottom inner perimeter 12 of the frame 11 to ensure a proper vertical positioning of the protrusion 17 which is used to mark the skin of the patient. Similarly, the horizontal arms 15 of the marking tool 13 are sized to fit into the slots 16 formed by the frame 11 which ensures a proper horizontal (and vertical) positioning of the protrusion 17. As can be somewhat seen in this embodiment, the tool 13 also has a protrusion 18 on its rear side as well. The two-sided protrusion configuration may make tool use easier as it can be used in the same way in either direction, limiting time and effort needed to properly orient. In some embodiments, the vertical arms 14 are sized to have a spacing or gap between their ends and the inner surface of the frame 11, while the horizontal arms 15 may fit into the slots 16. Such a configuration may make it easier to fit the marking tool 13 into the frame 11. In other embodiments, the vertical arms 14 may fit tightly to the inner surface of the frame 11.

Figure 3:
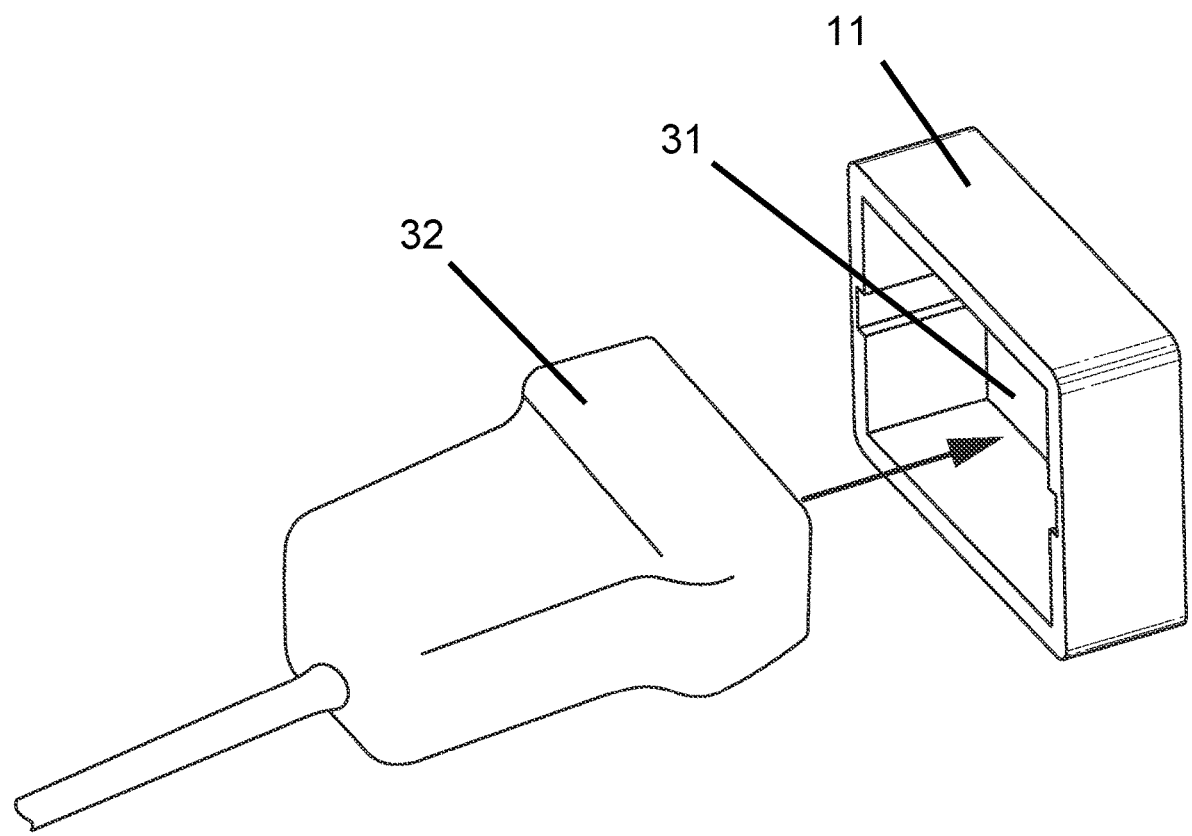
FIG. 3 provides a perspective view of still another embodiment of the present disclosure in use.
Figure 4:
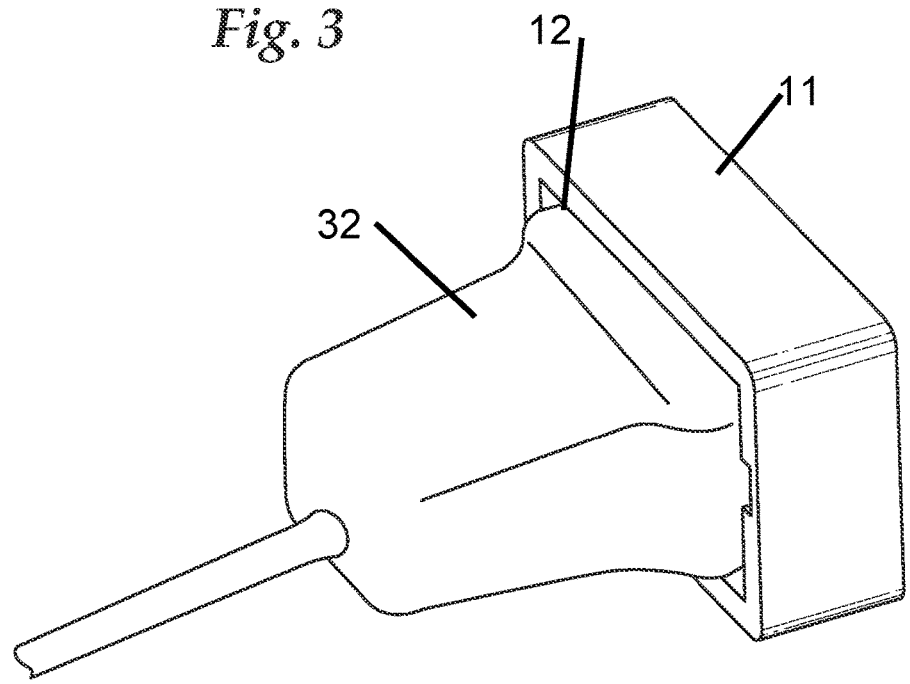
FIG. 4 provides a perspective view of yet still another embodiment of the present disclosure in use.

FIGS. 3 and 4 provide views of use of the ultrasound probe and frame together. The frame 11 is selected to fit closely around the front of the ultrasound probe 31 and defines an inner space 31 into which the probe may fit. By closely fitting around the probe 32, the frame 11 will move with the probe as the desired location is found, and will provide a precise alignment for later placement of the marking tool. If excessive gaps are present between the frame 11 and probe 32, the frame 11 could be moved out of proper alignment, leading to an incorrect marking location and in turn incorrect needle placement. As noted, once the desired location is found, the probe 32 is removed, and the frame 11 held in place for subsequent placement of the marking tool.

Figure 5:
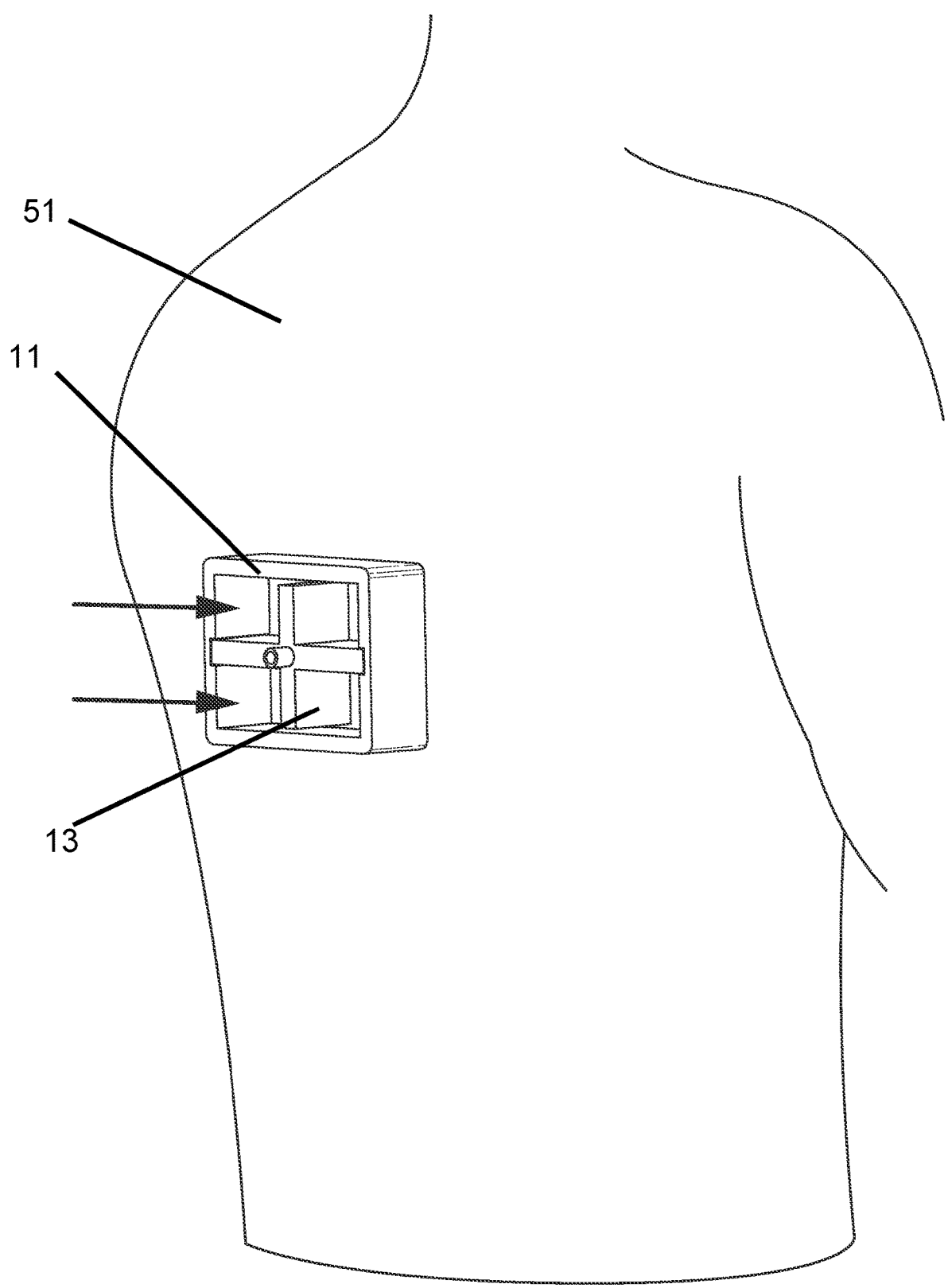
FIG. 5 provides a view of an embodiment of the present disclosure.
Figure 6:
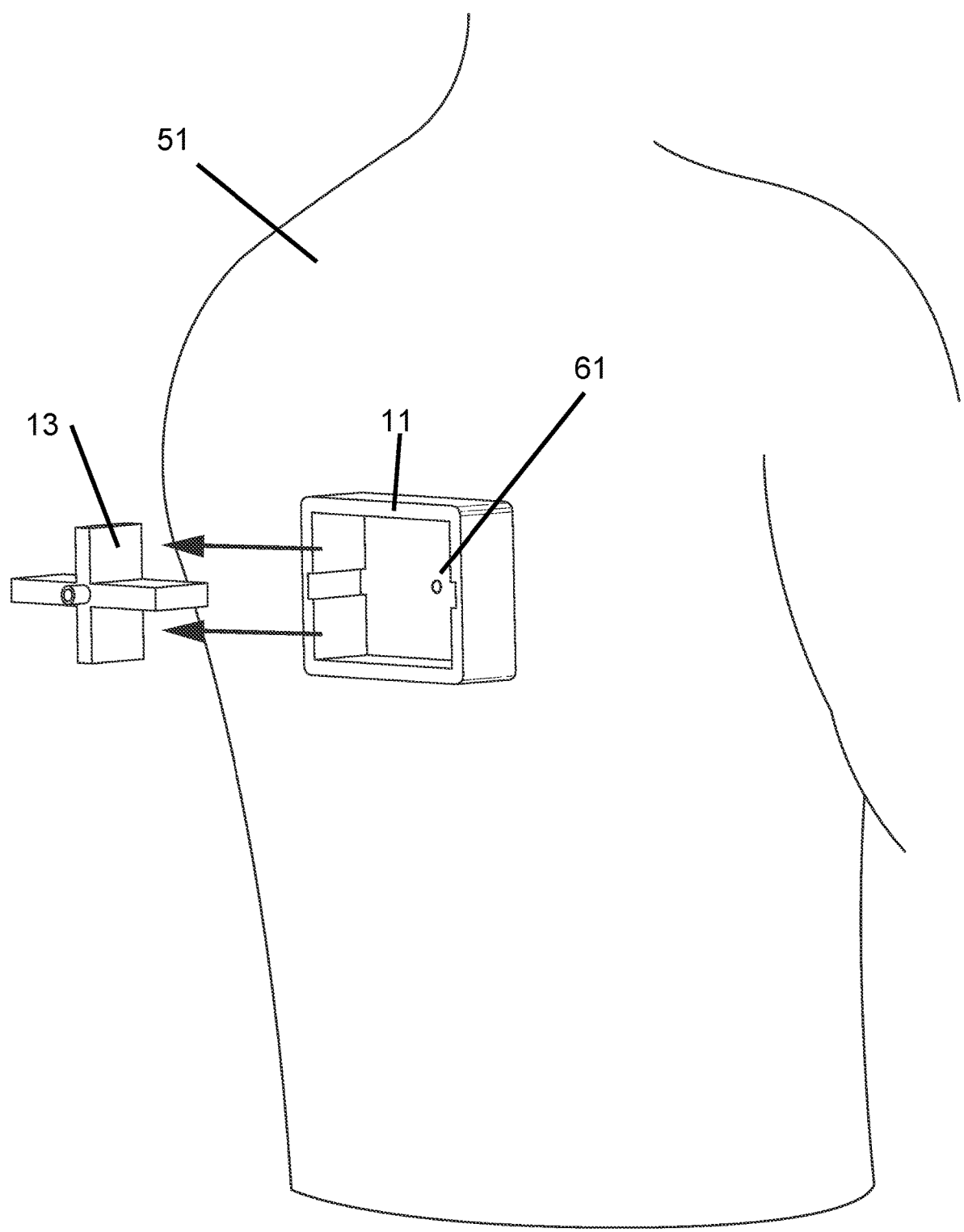
FIG. 6 provides a view of an embodiment of use of yet another embodiment of the present disclosure.

FIGS. 5 and 6 show an embodiment of the skin marking device in use after the ultrasound probe has been removed. The marking tool 13 is placed into the frame 11 which is held in place on the patient 51. The tool, in this embodiment, is pressed into the skin of the patient in the direction of arrows. Of course, other marking systems may be used such as ink, a spray, and the like. The protrusion of the tool will make a mark or indent 61 in the skin of patient 51. This in turn allows removal of the device (frame 11 and tool 13) for later needle (or other medical implement) insertion in a confirmed proper location.

It should be noted that while certain examples of the present disclosure have been presented using the present skin marking device with respect to epidural placement, that this device may be used for any number of applications, without straying from the scope of this invention. While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A skin-marking assembly comprising:
   an outer frame sized to fit closely around an outer perimeter of an ultrasound probe;
   a marking tool comprising top, bottom, left and right edges, the top, bottom, left edge, and right edge each being sized to slideably fit within an inner perimeter of the outer frame; and
   the marking tool comprising a protrusion on a front side, the protrusion sized and configured to form an indent in a skin of a patient;
   wherein the marking tool has a cross shape with a horizontal set of arms defining the left edge and right edge, and a vertical set of arms defining the top edge and bottom edge;
   the outer frame further comprising two recessed slots formed by the inner perimeter of the outer frame and each of the two slots recessed from the inner perimeter, the two recessed slots sized and shaped such that either the horizontal set of arms or the vertical set of arms fit into the recessed slots.

2. The skin-marking assembly of claim 1 wherein the marking tool further comprising a second protrusion on a rear side, the second protrusion having a same size and configuration as the protrusion on the front side.

3. The skin-marking assembly of claim 2 wherein the protrusion of the marking tool comprises a central opening, and wherein the central opening extends from the front side of the marking tool to the rear side of the marking tool through the second protrusion, forming a continuous opening between the protrusion and second protrusion.

4. The skin-marking assembly of claim 1 wherein the protrusion of the marking tool comprises a central opening.

5. The skin-marking assembly of claim 4 wherein the central opening extends from the front side of the marking tool to a rear side of the marking tool.

6. The skin-marking assembly of claim 1 wherein the outer frame has a rectangular shape and defines an opening through which the ultrasound probe may fit.

7. A skin-marking assembly comprising:
   an outer frame sized to fit closely around an outer perimeter of an ultrasound probe;
   a marking tool comprising top, bottom, left and right edges, the top, bottom, left edge, and right edge each being sized to slideably fit within an inner perimeter of the outer frame; and
   the marking tool comprising a protrusion on a front side, the protrusion defining an open shape such that a central opening is defined at a front of the protrusion;
   wherein the marking tool has a cross shape with a horizontal set of arms defining the left edge and right edge, and a vertical set of arms defining the top edge and bottom edge;
   the outer frame further comprising two recessed slots formed by the inner perimeter of the outer frame and each of the two slots recessed from the inner perimeter, the two recessed slots sized and shaped such that either the horizontal set of arms or the vertical set of arms fit into the recessed slots.

8. The skin-marking assembly of claim 7 wherein the marking tool further comprising a second protrusion on a rear side, the second protrusion having a same size and configuration as the protrusion on the front side.

9. The skin-marking assembly of claim 7 wherein the central opening extends from the front side of the marking tool to a rear side of the marking tool.

10. The skin-marking assembly of claim 7 wherein the outer frame has a rectangular shape and defines an opening through which the ultrasound probe may fit.

\* \* \* \* \*